United States Patent
Kim et al.

(10) Patent No.: US 9,542,851 B1
(45) Date of Patent: Jan. 10, 2017

(54) AVIONICS FLIGHT MANAGEMENT RECOMMENDER SYSTEM

(71) Applicant: The Boeing Company, Chicago, IL (US)

(72) Inventors: Geun Il Kim, Bellevue, WA (US); Tay Pham, Seattle, WA (US); Timothy C. Rohr, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/930,711

(22) Filed: Nov. 3, 2015

(51) Int. Cl.
| | |
|---|---|
| *G05D 1/00* | (2006.01) |
| *G06F 7/60* | (2006.01) |
| *B64C 13/02* | (2006.01) |
| *G08G 5/00* | (2006.01) |
| *B64D 43/00* | (2006.01) |

(52) U.S. Cl.
CPC ............ *G08G 5/0047* (2013.01); *B64D 43/00* (2013.01)

(58) Field of Classification Search
USPC .................................. 701/3; 703/2; 244/202
See application file for complete search history.

(56) References Cited

U.S. PATENT DOCUMENTS

| | | | |
|---|---|---|---|
| 6,760,778 B1 * | 7/2004 | Nelson ............... | H04B 7/18506 455/431 |
| 7,783,249 B2 | 8/2010 | Robinson | |
| 8,468,164 B1 | 6/2013 | Paleja et al. | |
| 2004/0193732 A1 * | 9/2004 | Nelson ............... | H04B 7/18506 709/246 |
| 2005/0043934 A1 * | 2/2005 | Hartmann ............ | G05D 1/0005 703/2 |
| 2007/0032921 A1 * | 2/2007 | Allen .................. | G01C 23/005 701/3 |
| 2008/0010107 A1 * | 1/2008 | Small .................... | G06Q 10/06 705/1.1 |
| 2009/0210276 A1 | 8/2009 | Krumm et al. | |
| 2010/0036545 A1 * | 2/2010 | Fok ....................... | G08G 5/0043 701/2 |
| 2010/0235186 A1 | 9/2010 | Firminger et al. | |
| 2012/0078449 A1 * | 3/2012 | Hamblin ................ | G06Q 50/30 701/3 |
| 2013/0026299 A1 * | 1/2013 | Constans ............. | G05D 1/0676 244/202 |
| 2013/0184978 A1 * | 7/2013 | Subbu .................. | G08G 5/0013 701/120 |
| 2014/0129058 A1 * | 5/2014 | Elahi .................... | G08G 5/0021 701/16 |

(Continued)

*Primary Examiner* — Tyler Paige
(74) *Attorney, Agent, or Firm* — Ostrager Chong Flaherty & Broitman P.C.

(57) ABSTRACT

A flight management system is modified so that it can deal with an unpredicted current event happening to an airplane based on non-standard maneuvers that have been carried out previously by other airplanes in similar circumstances. This allows the flight management system to adaptively or dynamically respond to a variety of flight path changes rather than rely solely on a set of fixed responses to predictable events during a flight. Specifically, the flight management system is configured to provide procedural recommendations to a flight crew in real time based on collaboratively filtered historical data such that the flight crew can make smarter choices while operating airplanes.

21 Claims, 7 Drawing Sheets

(56) References Cited

U.S. PATENT DOCUMENTS

2014/0249700 A1* 9/2014 Elias .................. B64D 31/00
                                                        701/14
2016/0093222 A1* 3/2016 Hale .................. G08G 5/0039
                                                       701/120

* cited by examiner

```
           RTE LEGS
    15 NM
    GEG          8000ft/230kt/3.4
       40 NM
    EPH          6000ft/220kt/3.2
       20 NM

RECMD >
```

FIG. 8

```
           RTE LEGS
    15 NM
    GEG          7500ft/220kt/3.5
       40 NM
    EPH          4000ft/190kt/3.3
       20 NM

NORMAL >
```

FIG. 9

AVIONICS FLIGHT MANAGEMENT RECOMMENDER SYSTEM

BACKGROUND

The technology disclosed herein generally relates to flight management systems for aircraft and, more particularly, relates to techniques for generating recommendations in a flight management system.

In modern commercial aircraft, a flight crew makes flight plan entries and modifications through a flight management system (FMS) comprising one or more flight management computers (FMCs) and, typically, left and right control display units (CDUs). The FMCs and CDUs are linked by redundant data buses. These CDUs are positioned to be accessed by the pilots for purposes of flight plan data entries into the CDUs and then to the FMCs for implementation of a desired flight plan.

A flight management system installed in the flight deck of a modern aircraft performs various flight critical functions such as navigation, guidance, flight planning, datalink and performance. For the performance function, the flight management system has various internal algorithms that utilize aerodynamic and propulsion performance data stored in an aero/engine database to compute predicted flight profile and the associated trip prediction parameters such as estimated time of arrival and predicted fuel consumption quantity. However, there are certain flight phases whose trip predictions are not accurately represented by the flight management system due to different real-life scenarios.

Many airlines are using machine learning and big data analytics to better understand true aerodynamic and propulsion characteristics of airplanes and to gain additional performance efficiency, thereby decreasing operating costs. While these technologies have primarily been focused on analyzing airplane behaviors, there is also a need to better understand different operational procedures taken by flight crews due to real-time third-party influences such as air traffic control. Such outside influences can interrupt predetermined flight profiles and cannot be modeled with current FMCs. This may result in use of a procedure that is inefficient operationally.

It would be advantageous to provide a flight management system that is configured to provide guidance when a pilot confronts different real-life scenarios which are not accounted for by static pre-defined logic models and pre-computed data.

SUMMARY

The subject matter disclosed in detail below is directed to a flight management system which is capable of recommending actions that need to be taken by a pilot using data collected during real-life operation of aircraft. A machine learning/data mining technique executed by a recommender system can be used to analyze historical data and propose solutions to the pilot during preflight or in flight.

In accordance with embodiments disclosed in some detail below, a flight management system is modified so that it can deal with an unpredicted current event happening to an airplane based on non-standard maneuvers that have been carried out previously by the same airplane and/or other airplanes in similar circumstances. This allows the flight management system to adaptively or dynamically respond to a variety of flight path changes rather than rely solely on a set of fixed responses to predictable events during a flight. Specifically, the flight management system is configured to provide procedural recommendations to a flight crew in real time based on collaboratively filtered historical data so that the flight crew can make smarter choices while operating airplanes.

As used herein, the term "recommender system" refers to an information filtering system that seeks to predict the 'rating' or 'preference' that a user would give to an item, action or information. The recommender systems contemplated herein produce recommendations by analyzing historical data that has been subjected to collaborative filtering. Automated collaborative filtering systems predict a person's affinity for items, actions or information by connecting that person's recorded interests with the recorded interests of a community of people and sharing ratings or preferences between like-minded persons. There are two types of collaborative filtering algorithms: memory-based and model-based. Memory-based collaborative filtering algorithms utilize the entire user-item or user-action database to generate a prediction. These systems employ statistical techniques to find a set of users, known as "neighbors", that have a history of agreeing with the target user in their ratings or preferences of particular items or actions. Once a neighborhood of users is formed, these systems use different algorithms to combine the preferences of neighbors to produce a prediction (i.e., recommendation) for the target user.

This disclosure proposes to use memory-based collaborative filtering to recommend actions by pilots during aviation operations. For example, a flight management system can be configured to use collaborative filtering to compute a better flaps extension profile based on the actions taken by pilots in previous flights by the same airplane and/or other airplanes. In particular, if the pilot repeatedly extends flaps earlier than what the flight management system predicts when flying into a certain airport using a certain approach, then the flight management flaps extension profile can be updated automatically to reflect this behavior. This can result in better trip prediction and fuel usage.

In alternative embodiments, collaborative filtering can be used to recommend to a pilot one or more of the following: a quiet climb noise abatement procedure during takeoff; autobrake and speed brake settings during landing, and a window for required time of arrival at different flap settings. This listing of potential applications is not exhaustive.

The flight management systems disclosed in detail below are configured (e.g., programmed using software modules) to execute an algorithm that uses machine learning techniques to analyze previous actions taken by flight crews and then determine a procedural recommendation which can be displayed to the flight crew in the flight deck in a timely manner. Such a flight management system may result in cost savings since the aero/engine database in the flight management system could be updated less frequently.

One aspect of the subject matter disclosed in detail below is a method for recommending pilot action onboard an airplane, comprising: (a) collecting historical data representing pilot actions and airplane and environmental characteristics during a multiplicity of flights; (b) filtering (e.g., using collaborative filtering) the historical data to derive relationship data representing a relationship between the pilot actions and airplane characteristics; (c) piloting the airplane; (d) collecting current data representing pilot actions onboard the airplane and characteristics of the airplane during step (c); (e) determining that the current data falls into the relationship; (f) generating a recommendation for pilot action by applying the relationship to a portion of the current data during step (c): and (g) taking a pilot action onboard the airplane in accordance with the recommendation. In accordance with some embodiments, the historical data comprises data representing actions and airplane recorded by a multiplicity of airplanes. Examples of recommendations which can be generated include the following: a flaps extension profile, a noise abatement departure procedure, auto brake and speed brake settings, and a window for required time of arrival at different flap settings. In accordance with some embodiments, step (b) is performed by an on-ground computer and steps (d) through (f) are performed by a flight management computer onboard the airplane, further comprising uploading the relationship data from the on-ground computer to the onboard computer via a datalink. In accordance with other embodiments, all of steps (a), (b), and (d)-(f) are performed by a flight management computer onboard the airplane.

Another aspect of the subject matter disclosed in detail below is a system for recommending pilot action onboard an airplane during a flight, comprising: a control display unit onboard the airplane; a plurality of sensors onboard the airplane, the sensors being configured to output current data representing pilot actions onboard the airplane and characteristics of the airplane; and a computer system configured to perform the following operations: (a) collecting historical data representing pilot actions and airplane characteristics during a multiplicity of flights; (b) filtering (e.g., using collaborative filtering) the historical data to derive relationship data representing a relationship between the pilot actions and airplane characteristics; (c) collecting the current data from the plurality of sensors during the flight; (d) determining that the current data falls into the relationship; (e) generating a recommendation for pilot action by applying the relationship to a portion of the current data while a pilot is flying the airplane; and (f) causing the control display unit to display symbology representing the recommendation. In accordance with some embodiments, the computer system comprises an on-ground computer that performs operations (a) and (b), and a flight management computer onboard the airplane that performs operations (c) through (f), and the system further comprises a datalink for uploading the relationship data from the on-ground computer to the onboard computer via a datalink. In accordance with other embodiments, all of steps (a), (b), and (d)-(f) are performed by a flight management computer onboard the airplane.

A further aspect of the disclosed subject matter is a method for recommending pilot action onboard an airplane, comprising: (a) collecting historical data representing pilot actions and environmental characteristics during a multiplicity of flights; (b) collaboratively filtering the historical data to derive relationship data representing a relationship between the pilot actions and environmental characteristics; (c) piloting the airplane; (d) collecting current data representing pilot actions onboard the airplane and environmental characteristics during step (c); (e) determining that the current data falls into the relationship; (f) generating a recommendation for pilot action by applying the relationship to the current data while the airplane is being piloted: and (g) taking a pilot action onboard the airplane in accordance with the recommendation.

Yet another aspect is a system for recommending pilot action onboard an airplane during a flight, comprising: a control display unit onboard the airplane; a plurality of sensors onboard the airplane, the sensors being configured to output current data representing pilot actions onboard the airplane and environmental characteristics; and a computer system configured to perform the following operations: (a) collecting historical data representing pilot actions and environmental characteristics during a multiplicity of flights; (b) collaboratively filtering the historical data to derive relationship data representing a relationship between the pilot actions and environmental characteristics; (c) collecting the current data from the plurality of sensors during the flight; (d) determining that the current data falls into the relationship; (e) generating a recommendation for pilot action by applying the relationship to a portion of the current data while a pilot is flying the airplane; and (f) causing the control display unit to display symbology representing the recommendation.

Other aspects of avionics flight management recommender systems are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 8 is a diagram representing a screenshot showing a trip prediction (altitude/speed/fuel quantity) based on the traditional (i.e., static) FMC method. However, the pilot is able to toggle to a recommender system by using the field at the bottom right-hand corner of the screenshot FIG. 9 is a diagram representing a screenshot showing a trip prediction (altitude/speed) based on an FMC recommender system. The pilot is able to fly slower and lower than using the static FMC procedure.

Reference will hereinafter be made to the drawings in which similar elements in different drawings bear the same reference numerals.

DETAILED DESCRIPTION

Illustrative embodiments of an avionics flight management recommender system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
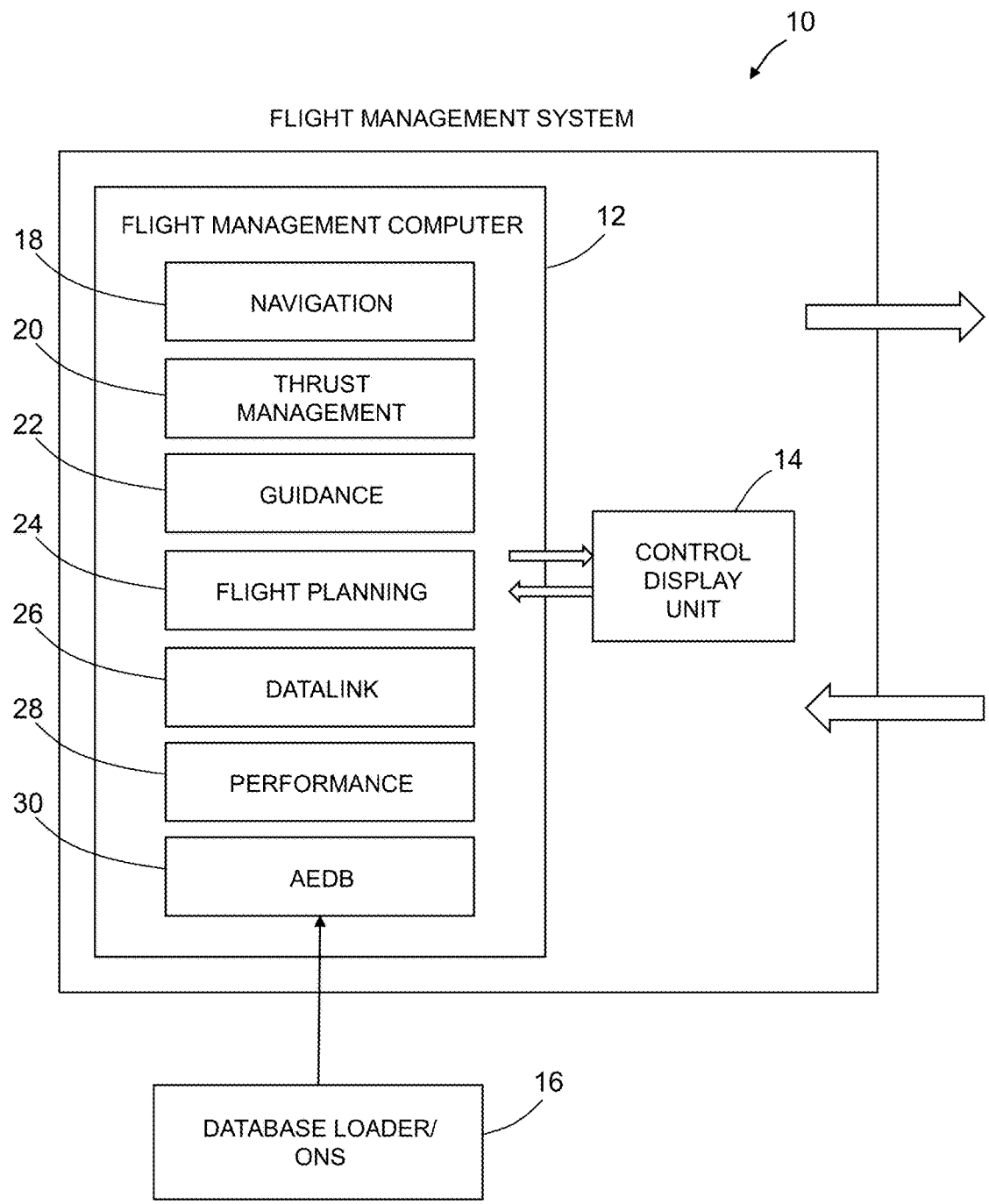
FIG. 1 is a block diagram showing an overall architecture of a typical flight management system.

FIG. 1 is a block diagram showing an overall architecture of a typical flight management system 10 of a type comprising one or more flight management computers 12. The FMC software may reside on respective core processors in respective airplane information management system (AIMS) cabinets. The FMC software may comprise the following: a flight management function, a navigation function 18, a thrust management function 20, and an aerodynamic and propulsion database 30, hereinafter "aero/engine database" (AEDB). The flight management function provides guidance 22, flight planning 24, datalink 26, a performance management function 28, CDU interfaces, an AEDB interface, and other functionalities. The navigation function provides sensor selection (inertial, radio, satellite), position solution determination and other functionalities. The navigation function computes aircraft position, velocity, track angle and other aircraft parameters, collectively termed aircraft states, to support FMCS functions such as flight planning, guidance, and display as well as AIMS—external functions. Included in the flight management system 10 are one or more CDUs. Only one control display unit 14 is depicted in FIG. 1. The CDUs are the primary interface between the flight management computer 12 and the pilots.

The flight management system 10 integrates information from an air data and inertial reference system, navigation sensors, engine and fuel sensors, and other airplane systems (not shown in FIG. 1), along with internal databases and crew-entered data to perform the multiple functions. The flight management computer may contain a navigation database (not shown in FIG. 1) and an aero/engine database 30.

For the performance management function 28, the flight management system 10 has various internal algorithms that utilize aerodynamic and propulsion performance data stored in the aero/engine database 30 to compute predicted flight profile and the associated trip prediction parameters such as estimated time of arrival and predicted fuel consumption quantity. The performance management function 28 uses aerodynamic and propulsion models and optimization algorithms to generate a full flight regime vertical profile consistent with the performance mode selected and within flight plan constraints imposed by air traffic control. Inputs to the performance management function 28 include fuel flow, total fuel, flap position, engine data and limits, altitude, airspeed, Mach number, air temperature, vertical speed, progress along the flight plan and pilot inputs from the CDU. The outputs are target values of Mach number, calibrated airspeed and thrust for optimum control of the airplane, and advisory data to the crew.

Various performance modes for each flight phase, such as economy climb, economy cruise and long-range cruise, may be selected by the pilot through the CDU. Multiple performance modes may be specified for the cruise flight phase. The default mode is an economy profile with speed limited. Economy profiles are computed to optimize fuel or time costs as governed by a cost index factor.

The aerodynamic and propulsion models are used to generate an optimum vertical profile for the selected performance modes. If the autothrottle or autopilot is not engaged for automatic control of the performance management function 28, the pilot can manually fly the optimum speed schedule by referring to the CDU and to the airspeed bug on the speed tape.

In accordance with the embodiment depicted in FIG. 1, the aero/engine database 30 is loaded by a database loader 16 using an onboard network system (ONS). The aero/engine on database 30 contains prestored data for the aerodynamic model of the airplane as well as for the engine performance model and thrust rating model of the engines. The aero/engine on database 30 is used by the performance management function 28 to compute real-time parameters such as speed limits and speed targets, and to perform predictive computations such as flight plan predictions. The aero/engine on database 30 is also used by the thrust management function 20 to compute thrust limits.

There may be certain flight phases whose trip predictions are not accurately represented by the flight management system 10 due to different real-life scenarios, such as when different operational procedures are taken by flight crews due to instructions from air traffic control. Such third-party influences can interrupt predetermined flight profiles and are not presently modeled by the flight management computer 12. This may result in use of a procedure that is inefficient operationally.

This problem can be addressed by providing a flight management system 10 that is configured to recommend actions to be taken by a pilot using data collected during real-life operation of similar aircraft. A machine learning/data mining technique executed by a recommender system can analyze historical data and propose solutions to the pilot during preflight or in flight. In accordance with the embodiments disclosed herein, the recommender system uses memory-based collaborative filtering to find a meaningful relationship between pilot action and airplane characteristics and then applies that established relationship to a flight that is about to take place (pre-flight planning purpose) and/or to a current in-flight situation (real time). The processor for performing collaborative filtering may be part of the flight management computer 10 or other onboard computer system that records the data to be collaboratively filtered and is connected to the flight management computer or may be part of an on-ground computer system (in which case the collaborative filtering data can be uploaded to the aero/engine database 30 onboard the aircraft via a datalink).

Figure 2:
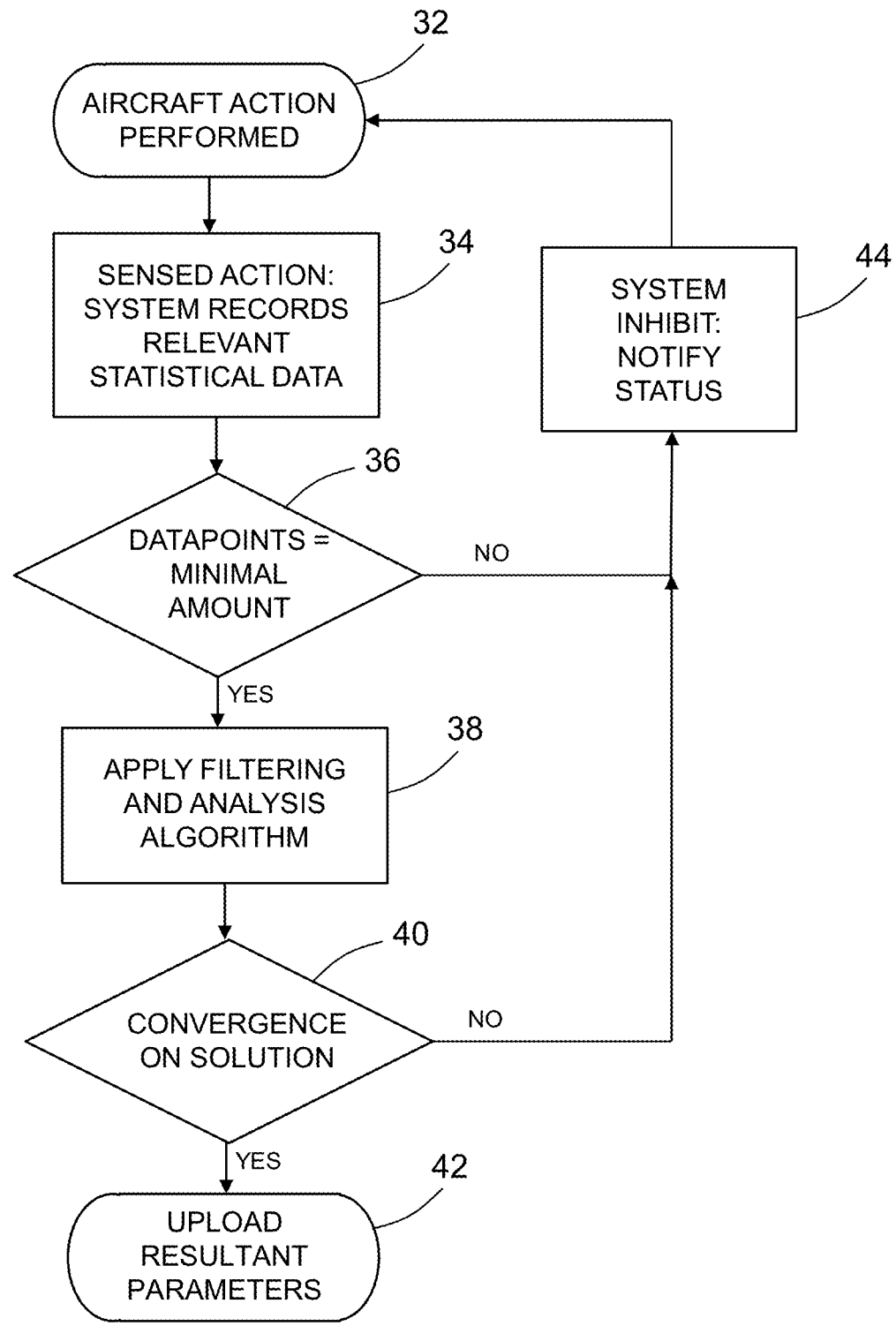
FIG. 2 is a flowchart identifying steps of a method for establishing a relationship between pilot actions and airplane characteristics using collaborative filtering in accordance with one embodiment.

FIG. 2 is a flowchart identifying steps of a method for establishing a relationship between pilot actions and airplane characteristics using collaborative filtering in accordance with one embodiment. The particular example that will be described in detail involves computing a better flaps extension profile based on the actions taken by the pilots in previous flights. For the purpose of illustration, an embodiment will be described in which the collaborative filtering is performed by a computer system other than the flight management computer 12 and the filtering results are then uploaded to the aero/engine database 30 of the flight management computer 12 for use in a recommendation generation process that is part of the performance management function 28.

In the flowchart shown in FIG. 2, pilots aboard aircraft in flight perform actions 32. For example, a pilot may extend the flaps to various degrees when an aircraft is at certain distances from a destination. Each time that a pilot onboard an aircraft performs an action 32, that action is sensed by associated sensors and the data outputted by the sensors is then recorded by a data recordation process 34. Concurrently, the data recordation process 34 records the airplane parameters associated with the recorded pilot actions. For example, the distance from the destination or gross weight of the airplane or environmental data (such as temperature/wind at the time the flaps are extended) are recorded. The data recording can be done by the flight management computer 12 or other onboard systems connected to the flight management computer 12. The recorded data can be stored onboard the aircraft and later downloaded to another computer system in well-known ways. Data from a multiplicity of aircraft can be collected and stored in a central database. The data recorded in the central database can be accessed by the computer system that hosts a filtering and analysis algorithm 38.

In step 36, the computer system that hosts the filtering and analysis algorithm 38 determines whether a sufficient number of pilot actions and the associated airplane parameters have been recorded to perform the filtering and analysis algorithm 38 or not. The more data that is collected, the stronger the relationship that can be established. If there is insufficient recorded data, then the system inhibits (see step 44 in FIG. 2) the command to execute the filtering and analysis algorithm 38. Rather, the data recordation processes run in the background to collect more data.

If there is sufficient recorded data, then the computer system performs the filtering and analysis algorithm 38 using collaborative filtering to find a relationship between the pilot action and airplane characteristics such as airplane model/gross weight/distance from the destination. In alternative embodiments, the computer system performs the filtering and analysis algorithm 38 using collaborative filtering to find a relationship between the pilot action and environmental data (also referred to herein as "environmental characteristics") such as temperature/wind at the time the flaps are extended. This can be done by a computer system configured to collaboratively filter the recorded data, thereby generating tables comprising data representing relationships between pilot action and airplane (or environmental) characteristics. The collaborative filtering computer system then determines whether a meaningful relationship has been established by the filtering and analysis algorithm 38 (step 40).

Figure 4:
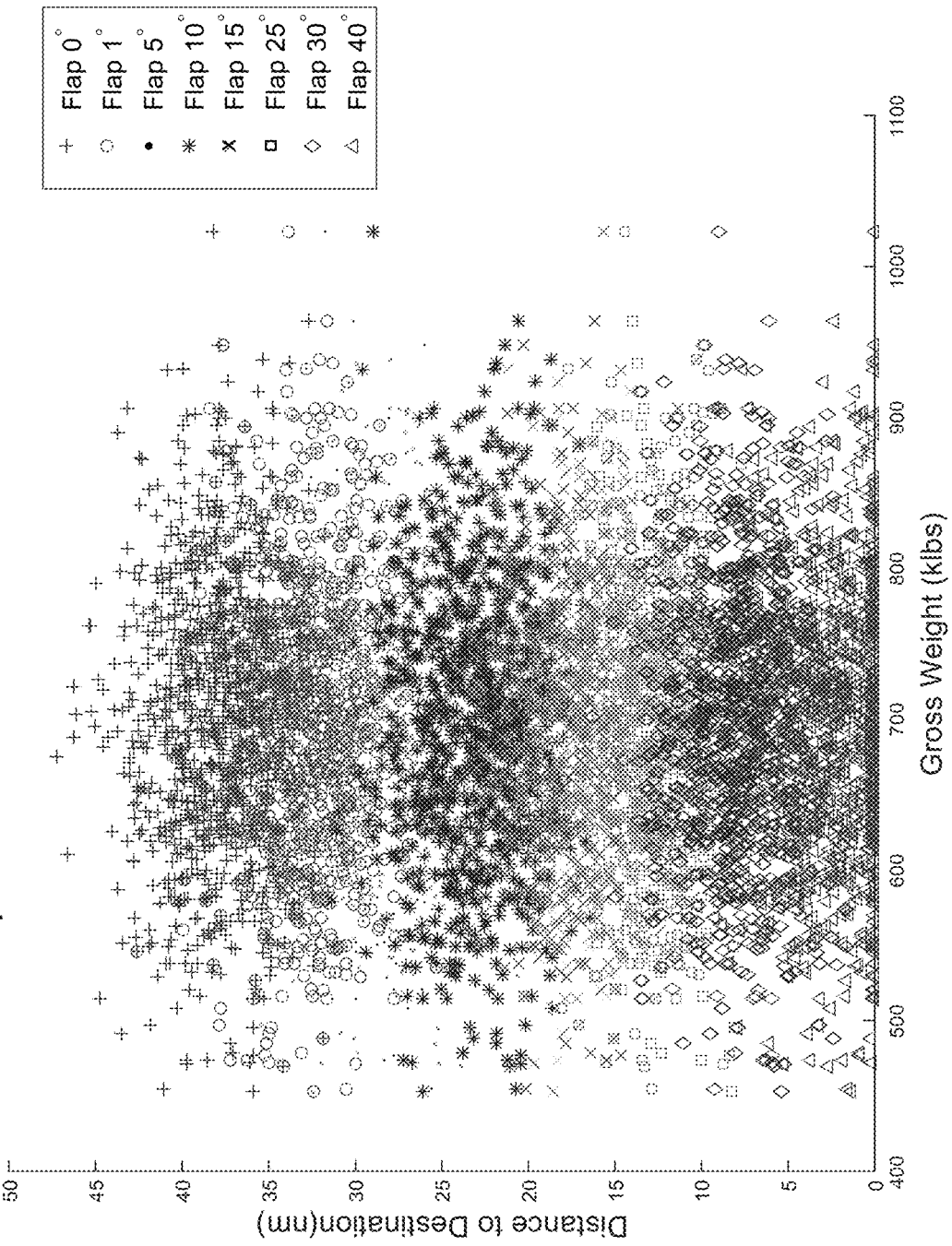
FIG. 4 is a graph showing a set of historical flaps extension data. The horizontal axis is gross weight of the airplane; the vertical axis is distance from destination. The symbology represents different flap positions in degrees: (+) 0°; (○) 1°; (·) 5°; (*) 10°; (×) 15°; (□) 25°; (◇) 30°; (Δ) 40°. This data was randomly generated for the purpose of testing.

This can be as simple as checking the relationship against the minimum or maximum values from the collected data. As seen in FIG. 4, the points for flaps at a position of 0° are within about 30 to 50 nm from the destination. If the computed relationship somehow indicates that flaps should be at 0° when the airplane is 5 nm from the destination, then it should be obvious that the relationship is not "meaningful". A more complex method to check whether the relationship is meaningful or not is to compare it against an independent relationship computed by another means. For example, if an aircraft manufacturer tells airlines that the flaps should be at a position of 0° within about 35 to 45 nm from the destination, then the airlines may decide to reject any computed relationship that lies ±10 nm from that recommendation. (If this information can be somehow uploaded into the onboard system and the onboard system can utilize it, then in alternative embodiments, the onboard system can decide whether the relationship is "meaningful".)

If a meaningful relationship has been established, the relationship parameters and the recorded action and parameter value data can be uploaded to the flight management computer 12 (step 42). These parameter values and/or action data may or may not be displayed.

In alternative embodiments, a flight management computer 12 onboard an aircraft may be configured to generate the relationship tables from its own recorded data and data received from other aircraft. For example, if one considers a single airplane of a particular model it can fly from one airport to another and back to the original airport in a single day. For example, it can fly from Seattle to Los Angeles in the morning and get back to Seattle in the evening on the same day. If there is a recommender system onboard, then it can gather 30 sets of data in one month and 180 sets of data in half a year on these two routes (Seattle to Los Angeles and Los Angeles to Seattle). If the minimum number of data sets is 30, then this airplane is capable of making recommendations to the pilot after one month. Thus, it is possible for each airplane to have its own onboard recommender system. In this situation, the "entire" recommender system is onboard a single airplane.

If one wants to apply data from a group of airplanes, then the data can be collected from a group of airplanes and the relationship data can be uploaded to an airplane. Whether the relationship is meaningful or not can be determined before the relationship data is updated to an airplane. In alternative embodiments, the historical data could be uploaded from other airplanes to each airplane. If there is a storage onboard the airplane, this can easily be done via datalink/ONS. And then each airplane can determine whether the relationship is meaningful or not based on the data it has collected during its own flights. For example, each airplane can compare the data it collected from its own flights against the uploaded relationship parameters, and if they are different (like the min/max examples disclosed above), then the FMC recommender system onboard the airplane can determine whether the relationship is meaningful or not.

Figure 3:
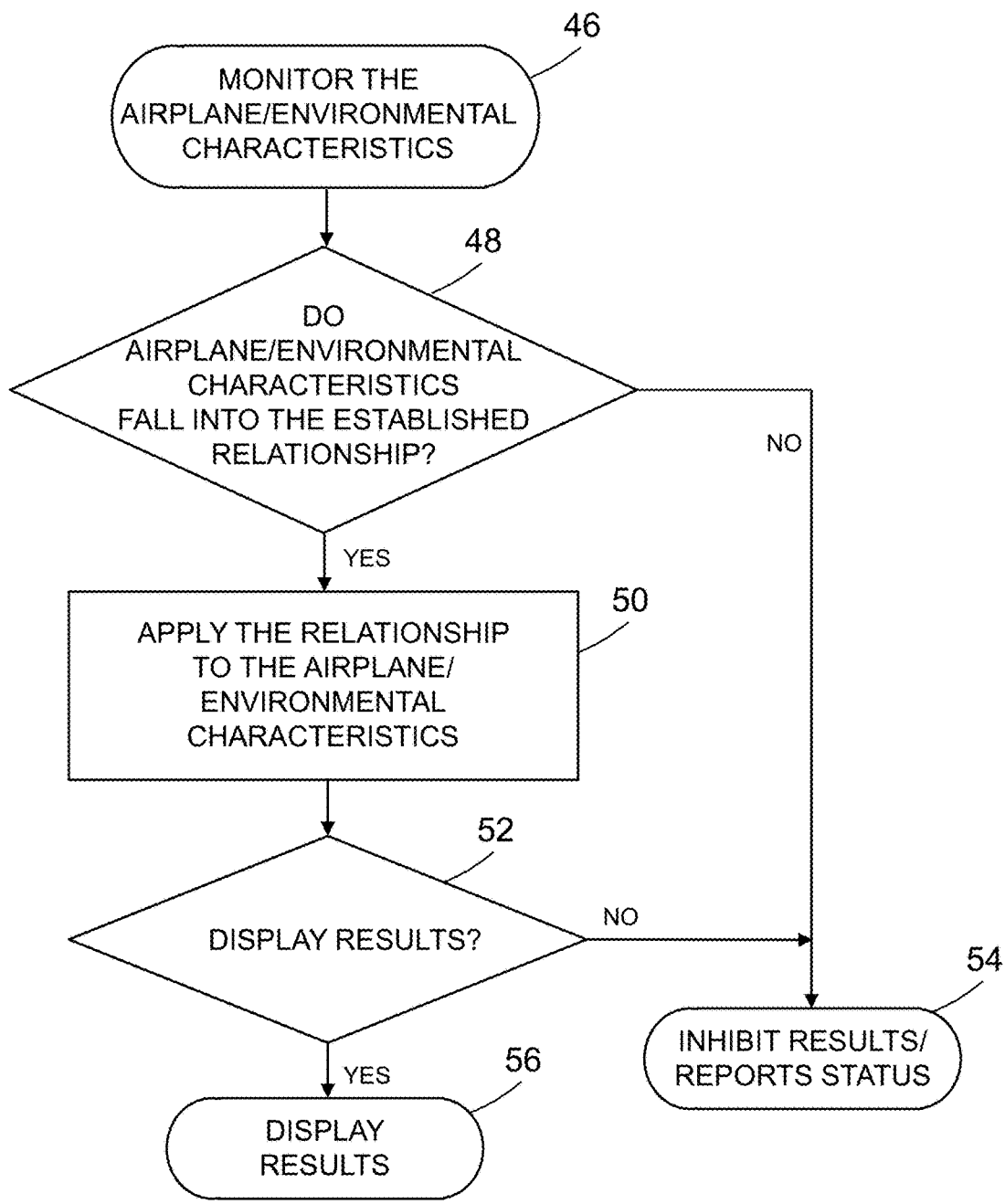
FIG. 3 is a flowchart identifying steps of a method for applying an established relationship to a flight that is about to take a place (pre-flight planning purpose) and/or to a current in-flight situation (real time) in accordance with one embodiment.

FIG. 3 is a flowchart identifying steps of a method for applying an established relationship to a flight that is about to take a place (planning purpose) and/or to a current situation (real time) in accordance with one embodiment. For example, once the relationship has been established to match a better flaps extension profile to specific airplane/environmental characteristics, a recommendation can be presented to the pilot before takeoff or during flight in real time.

The recommendation generation process depicted in FIG. 3 may be part of the performance management function 28 (see FIG. 1), i.e., the flight management computer 12 hosts recommendation generation software for generating recommendations. The recommendation generation software is configured to monitor the preflight or current real-time airplane/environmental characteristics (step 46). For example, such monitoring may take into account the destination airport, airport approach procedure, airplane model, gross weight, environmental data such as wind or temperature, etc.

Then the recommendation generation software determines whether the preflight or current airplane/environmental characteristics fall into the established relationship or not (step 48). For example, if the aircraft is a new airplane model that was not considered in establishing the relationship, then the established relationship cannot be used for this new airplane model. Or if the aircraft has very high gross weight that was not considered in establishing the relationship, then the relationship cannot be applied to this gross weight. If the preflight or current airplane/environmental characteristics do not fall into the established relationship, then no recommendation is generated and that status (i.e., no recommendation available) is reported to the pilot (step 52).

If the recommendation generation process determines that the preflight or current airplane/environmental characteristics fall into the established relationship, then the recommendation generation process applies the relationship to the airplane/environmental characteristics and generates a recommendation (step 48). For example, based on the gross weight of the target airplane, the established relationship is used to compute a recommended distance from the destination airport at which the pilot may wish to adjust the flap extension setting.

The fact that a recommendation is available may be indicated on the screen of a CDU. Upon observing such indicator, the pilot has an option to display the recommendation (step 50). If the pilot chooses not to display the recommendation, then the control display unit 14 will continue to display the baseline values provided by the flight management computer 12 (i.e., display of the recommendation is inhibited as indicated in step 52 of FIG. 3). If the pilot chooses to display the recommendation, then this action triggers the flight management computer 12 to cause the recommendation to be displayed on the control display unit 14.

As is apparent from FIGS. 2 and 3, the method for recommending a flaps extension profile to a pilot onboard an airplane may comprise: (a) collecting historical data representing flap settings, airplane gross weights and distances to destination during a multiplicity of flights; (b) collaboratively filtering the historical data to derive relationship data representing a relationship between the flap settings, airplane gross weights and distances to destination; (c) piloting the airplane; (d) collecting current data representing a gross weight of the airplane and a distance from a destination during step (c); (e) determining that the current data falls into the relationship; (f) generating a recommended flaps extension profile by applying the relationship to a portion of the current data during step (c); and (g) setting the flaps onboard the airplane in accordance with the recommended flaps extension profile.

FIG. 4 is a graph showing a sample set of historical flaps extension data which was randomly generated for the purpose of testing. The horizontal axis is gross weight of the airplane; the vertical axis is distance from destination. The symbology represents different flap positions in degrees: (+) 0°; (○) 1°; (·) 5°; (*) 10°; (×) 15°; (□) 25°; (◇) 30°; (Δ) 40°. The position of each symbol on the graph indicates the distance from destination and gross weight for that particular data point. This data can be processed by a computer system using collaborative filtering to establish a relationship among the flap positions, the distances from destination and the gross weights.

The average gross weight for the randomly generated data depicted in FIG. 4 is 699.6 klbs. The average flaps extension location (i.e., distance from destination) for the various flap positions are listed in the following table:

TABLE 1

| Flap Position (degrees) | Average Distance to Destination (nm) |
|---|---|
| 0 | 37.7 |
| 1 | 32.8 |
| 5 | 27.7 |
| 10 | 22.7 |
| 15 | 17.6 |
| 25 | 12.7 |
| 30 | 7.8 |
| 40 | 2.7 |

Table 2 (see below) shows the flaps extension recommendation computed by a flight management computer programmed with recommendation generation software of the type described above when the pilot enters a new flight gross weight value, which in this example was equal to the average gross weight used in Table 1. The flight management computer analyzes the relationship data (which may be stored in an aero/engine database, as previously described) and then computes the best recommendation based on such analysis. Compared to Table 1, even when the entered gross weight is nearly the same as the average gross weight derived from the randomly generated historical data, the recommended flaps extension locations (expressed as distance to destination) are different because the relationship data better models the trend of the historical data rather than providing the average of that data.

TABLE 2

| Flap Position (degrees) | Recommended Distance to Destination (nm) |
|---|---|
| 0 | 35.1 |
| 1 | 30.5 |
| 5 | 25.9 |
| 10 | 21.4 |
| 15 | 16.8 |
| 25 | 12.2 |
| 30 | 7.9 |
| 40 | 3.2 |

TABLE 3

| Flap Position (degrees) | Recommended Distance to Destination (nm) |
|---|---|
| 0 | 42.0 |
| 1 | 36.0 |
| 5 | 32.7 |
| 10 | 26.6 |
| 15 | 18.4 |
| 25 | 13.9 |
| 30 | 7.3 |
| 40 | 4.2 |

Table 3 shows the flaps extension recommendations computed by the flight management computer by analyzing the trend represented by the flap position/distance from destination relationship data. In this example, when the pilot enters a gross weight of 900 klbs, the flight management computer is able to compute recommended airplane locations at which the various flap positions should be implemented, which locations differ from those seen in Table 2.

Figure 5:
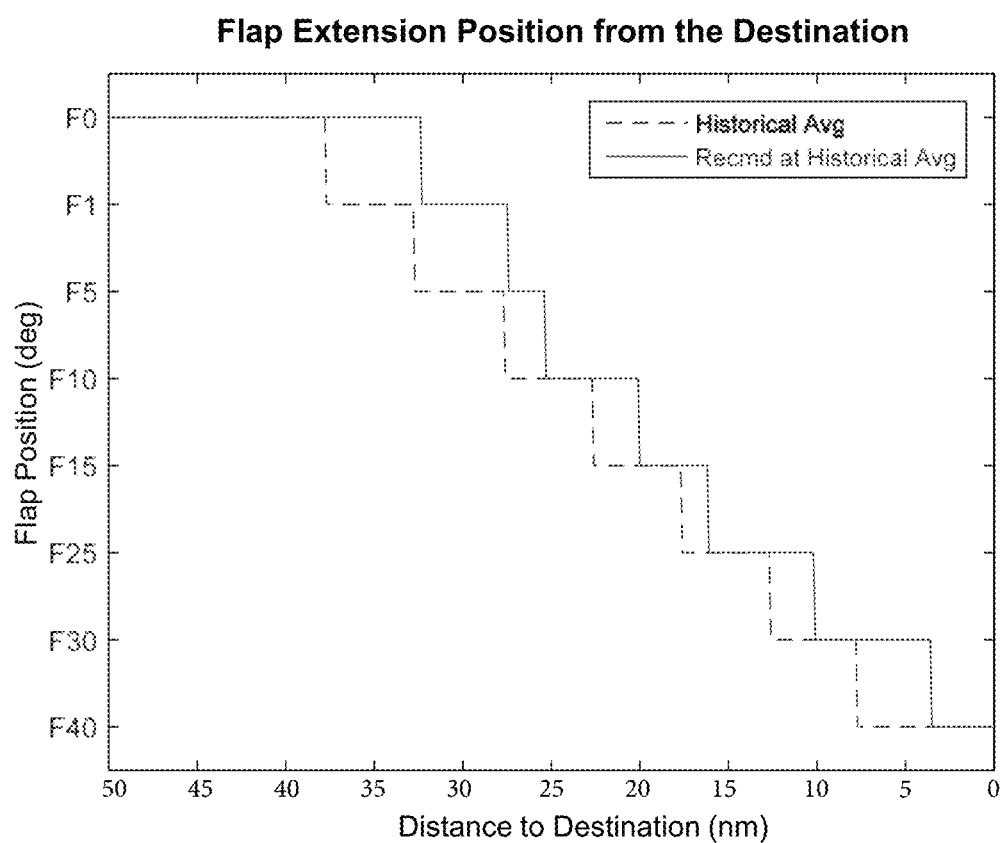
FIG. 5 is a graph of flap position (deg) versus distance to destination (nm) showing a comparison between the flaps extension recommendation computed by the flight management computer (solid lines) and the average historical distance-to-destination data (dashed lines) for airplanes having a historical average gross weight of 699 klbs.

FIG. 5 is a graph of flap position (deg) versus distance to destination (nm) showing a comparison between the flaps extension recommendation computed by the flight management computer (see Table 2) and the average historical distance-to-destination data (see Table 1) for airplanes having the historical average gross weight of 699 klbs. The difference is significant even when the same gross weight is used to compute the distances from destination at which the flaps are extended.

Figure 6:
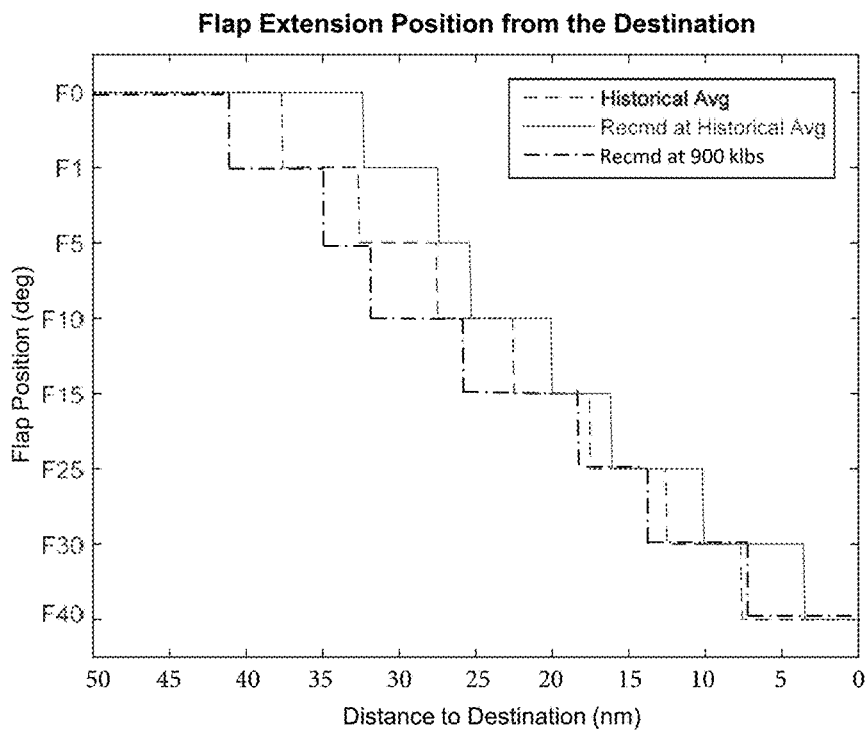
FIG. 6 is a graph of flap position (deg) versus distance to destination (nm) showing a comparison between the flaps extension recommendation computed by the flight management computer for an airplane having a gross weight of 900 klbs (dash—dot lines) and the data presented in FIG. 5.

FIG. 6 is a graph of flap position (deg) versus distance to destination (nm) showing a comparison between the flaps extension recommendation computed by the flight management computer for an airplane having a gross weight of 900 klbs (see Table 3), the flaps extension recommendation computed by the flight management computer for an airplane having the historical average gross weight (see Table 2), and the average historical distance-to-destination data (see Table 1) for airplane having the historical average gross weight. The recommender system was able to adjust the flaps extension distance based on the trend found in the relationship data.

In the foregoing example, the relationship data representing pilot ratings or preferences may be in the form of a respective flap position-to-distance to destination mapping for each one of a multiplicity of gross weights or gross weight ranges. The recommender system is configured to accept an indication of a gross weight from a user as input and then output a recommended flap position-to-distance to destination mapping for the user. These mappings are generated by a collaborative filtering engine by filtering the historical data to determine pilot ratings or preferences. The recommendation generation software can be configured to apply different similarity measures for different situations against the multiplicity of pilot ratings or preferences and generate a recommendation concerning what distances from the destination the positions of the flaps should be changed.

Figure 7:
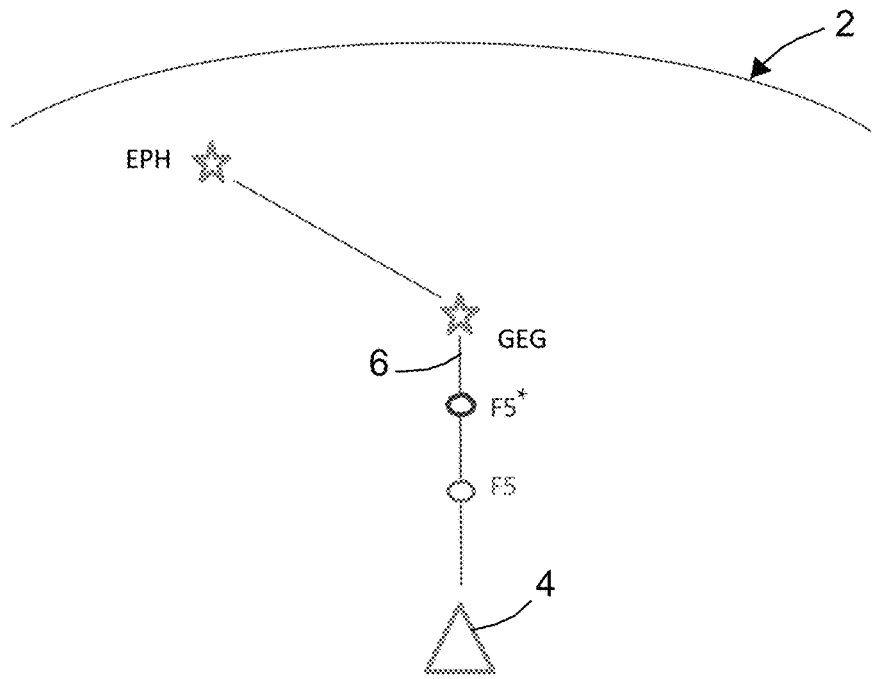
FIG. 7 is a diagram showing a portion of a screenshot on a navigation display in which respective symbols (namely, the ellipses respectively labeled F5* and F5) are displayed to indicate respective locations, computed by a flight management computer with and without a recommender system respectively, where the flaps should be extended to the 5° position. The triangle indicates the position of ownship, while the stars indicate respective waypoints GEG and EPH along ownship's flight path.

FIG. 7 is a diagram showing a portion 2 of a screenshot on a navigation display (e.g., presented on the control display unit 14 in FIG. 1) in which respective symbols (namely, the ellipses respectively labeled F5* and F5) are displayed to indicate respective locations, computed by a flight management computer 12 with and without a recommender system respectively, where the flaps should be extended to the 5° position. The triangle 4 indicates the position of ownship, while the stars indicate respective waypoints GEG and EPH along ownship's intended flight path 6. The location indicated by the ellipse labeled F5 is computed by the flight management computer 12 using a traditional static method (i.e., not using the recommendation generation software disclosed herein). In contrast, the location indicated by the ellipse labeled F5* is computed by the flight management computer 12 using recommendation generation software. The pilot can choose which one to follow. In practice, the ellipse F5 may be green while the ellipse F5* may be red, in which case both ellipses could have the same label "F5" and the asterisk would be unnecessary. The asterisk has been used in FIG. 7 to distinguish the two ellipses only due to the inability to show colors in a black-and-white drawing.

FIG. 8 is a diagram showing a screenshot 60 on a control display unit that displays the trip prediction (altitude/speed) for the flight path depicted in FIG. 7 based on the traditional static flight management computer method. However, the pilot is able to toggle to the recommender system by touching the field 62 in the lower right-hand corner of screenshot 60.

In response to the pilot choosing the recommender system, a recommendation screenshot 64 (shown in FIG. 9) takes the place of the screenshot 60. FIG. 9 shows the trip prediction (altitude/speed/fuel quantity) based on the flight management computer recommender system. The pilot is able to fly slower and lower than if the static flight management computer procedure were used. If the pilot decides not to adopt the recommendation, he/she can return to screenshot 60 (see FIG. 8) by touching the field 66 in the lower right-hand corner of screenshot 64.

The flight management systems disclosed herein provide procedural recommendations to flight crews in real time such that they can make smarter choices while operating airplanes. The flight management system can be configured (e.g., programmed using software modules) to execute an algorithm that uses machine learning techniques to analyze previous actions taken by flight crews and then determines procedural recommendations which can be displayed to a flight crew in a flight deck in a timely manner. Such a flight management system may result in cost savings since the aero/engine database in the flight management system could be updated less frequently.

The collaborative filtering algorithm is preferably memory-based. For example, the algorithm may be similar to what is used to recommend movies/items to users based on the ratings (one to five stars) they have rated as well as what other users with similar interests have rated. The ratings in the instant application are flight management system parameters where (or when) the pilot takes certain actions. In the flaps extension example, the ratings are the distance from the destination airport where the pilot extends each flap setting. Thus instead of the ratings being from one to five stars, the ratings embrace a wide range of numbers (for example, from 0 to 50 nm as shown in FIG. 4). Also, in the known item-based recommender system, the items that users rate are different movies. In the flaps extension example disclosed above, the items are different flap settings. Thus, the pilots extend the flaps to a certain position (items) at different locations from the destination airport (ratings). In addition, in the flaps extension example, since we are interested in recommending the flaps extension location based on aircraft gross weight, the gross weight is also treated as a rating like the distance from the destination. Its rating can go from 400 to 110 klbs, as shown in FIG. 4. The idea is that if there is an airplane with a similar gross weight (ratings), the flaps extension recommendation (items) can be made based on the previous flights with similar gross weights (similar ratings).

In accordance with one embodiment, the algorithm computes the best possible correlation between the flaps extension locations/gross weights (ratings) versus. different flap settings (items). This means that given a set of previous flight data (that includes the aircraft gross weight and the locations from the destination airport where the different flap settings are extended and different flap settings), a curve is drawn such that the distance between the curve and each rating (flaps extension locations) is minimized. So basically, this curve relates the flap settings to other parameters that are provided. In one embodiment of the algorithm, a gradient descent technique is used, which basically follows iteratively the direction where the cost (difference between the line and the dataset) is minimized. If the cost cannot be minimized any further, the gradient descent quits and returns the results. This guarantees that the best possible neighbors are found.

It should be noted that in the flaps extension example, the target user—which is the airplane that is about to take off or the airplane that is already operating in real time—has already made one rating since it already has a gross weight. Thus, using this gross weight data, the algorithm will be able to find neighbors that had similar gross weights in the past. And the recommendation is made by computing a curve with this gross weight that minimizes the distance to each rating (flaps extension locations). The flap settings associated with this curve are recommended. This is different than simply computing a weighted average of the "ratings". This can be seen in FIG. 5, which shows a comparison between the flaps extension recommendation computed by the flight management computer and the average historical distance-to-destination data for airplanes having the historical average gross weight of 699 klbs. In FIG. 6, the algorithm is able to make a better recommendation using the fact that the target airplane had a gross weight of 900 klbs. The use of collaborative filtering enables flight management computer parameter values associated with certain pilot actions to be treated as ratings and the generation of recommendations during a flight that exhibits similar ratings.

A recommender system based on collaborative filtering can be used to improve the accuracy of climb/descent flaps retraction/extension profiles computed by an avionics flight management system, thereby reducing deployment inefficiencies and achieving better airplane operation. A recommender system can also be applied in other flight management scenarios.

For example, the same techniques may be used to achieve improved quiet climb noise abatement (a.k.a. noise abatement departure procedures). At some airports near densely populated areas, there is an option in the flight management system that can be turned on to reduce thrust during takeoff so that the airplane engine noise can be abated up to a certain altitude/distance. This kind of procedure within the flight management system is usually static, meaning that they are controlled by certain parameters in the aero/engine database whose values are rarely changed. Accurate modeling of an aircraft departure begins with the selection of a takeoff gross weight, takeoff thrust, flap setting, temperature, and airport elevation. In addition, management of the aircraft configuration and thrust during the initial climb must be specified. The initial climb is characterized by segments of constant speed climb, acceleration, and flap retraction along with an initial thrust reduction from takeoff power. Using collaborative filtering, the flight management system can recommend to the pilots the procedures that have been followed multiple times in the past by other pilot. These "dynamic" procedures can provide the pilots with accurate trip prediction during preflight.

Another potential application involves the auto brake and speed brake settings. A filtering and analysis algorithm can be configured to analyze auto brake and speed brake settings and then make a recommendation to the pilot during their approach planning and also in real time.

A further example would be to recommend a window for required time of arrival at different flap settings. A filtering and analysis algorithm could be configured to analyze historical data and relate flap settings to speed target and compute a recommended window for required time of arrival while operating with different flap settings.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit).

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for recommending pilot action onboard an airplane, comprising:
    (a) collecting historical data representing pilot actions taken by a community of pilots and airplane characteristics during a multiplicity of flights;
    (b) collaboratively filtering said historical data to derive relationship data representing a relationship between the pilot actions and airplane characteristics;
    (c) piloting the airplane;
    (d) collecting current data representing pilot actions onboard the airplane and characteristics of the airplane during step (c);
    (e) determining that said current data falls into said relationship;
    (f) generating a recommendation for pilot action by applying said relationship to said current data while the airplane is being piloted: and
    (g) taking a pilot action onboard the airplane in accordance with said recommendation.

2. The method as recited in claim 1, wherein said historical data comprises data representing actions and airplane characteristics recorded by the airplane during previous flights.

3. The method as recited in claim 1, further comprising displaying said recommendation on a control display unit in a flight deck of the airplane.

4. The method as recited in claim 1, further comprising:
    (h) displaying a selectable recommendation indicator on a control display unit in a flight deck of the airplane;
    (i) selecting the selectable recommendation indicator; and
    (j) displaying said recommendation on the control display unit in response to step (i).

5. The method as recited in claim 1, wherein said airplane characteristics comprise airplane gross weight and distance from destination.

6. The method as recited in claim 1, wherein step (b) is performed by an on-ground computer and steps (d) through (f) are performed by a computer onboard the airplane, further comprising uploading said relationship data from the on-ground computer to the onboard computer via a datalink.

7. The method as recited in claim 1, wherein steps (b), (d), (e) and (f) are performed by a computer onboard the airplane.

8. The method as recited in claim 1, wherein said historical data comprises data representing actions and airplane characteristics recorded by a multiplicity of airplanes.

9. The method as recited in claim 1, wherein said recommendation comprises any one of the following: a flaps extension profile; a noise abatement departure procedure; a reduction in thrust during takeoff; auto brake and speed brake settings; and a window for required time of arrival at different flap settings.

10. A method for recommending pilot action onboard an airplane, comprising:
   (a) collecting historical data representing pilot actions and airplane characteristics during a multiplicity of flights;
   (b) filtering said historical data to derive relationship data representing a relationship between the pilot actions and airplane characteristics;
   (c) piloting the airplane;
   (d) collecting current data representing pilot actions onboard the airplane and characteristics of the airplane during step (c);
   (e) determining that said current data falls into said relationship;
   (f) generating a recommendation for pilot action by applying said relationship to said current data while the airplane is being piloted: and
   (g) taking a pilot action onboard the airplane in accordance with said recommendation,
   wherein said historical data comprises data representing actions and airplane characteristics recorded by a multiplicity of airplanes.

11. A method for recommending pilot action onboard an airplane, comprising:
   (a) collecting historical data representing pilot actions and airplane characteristics during a multiplicity of flights;
   (b) filtering said historical data to derive relationship data representing a relationship between the pilot actions and airplane characteristics;
   (c) piloting the airplane;
   (d) collecting current data representing pilot actions onboard the airplane and characteristics of the airplane during step (c);
   (e) determining that said current data falls into said relationship;
   (f) generating a recommendation for pilot action by applying said relationship to said current data while the airplane is being piloted: and
   (g) taking a pilot action onboard the airplane in accordance with said recommendation,
   wherein said recommendation comprises any one of the following: a flaps extension profile; a noise abatement departure procedure; a reduction in thrust during takeoff; auto brake and speed brake settings; and a window for required time of arrival at different flap settings.

12. A system for recommending pilot action onboard an airplane during a flight, comprising:
   a control display unit onboard the airplane;
   a plurality of sensors onboard the airplane, said sensors being configured to output current data representing pilot actions onboard the airplane and characteristics of the airplane; and
   a computer system configured to perform the following operations:
   (a) collecting historical data representing pilot actions taken by a community of pilots and airplane characteristics during a multiplicity of flights;
   (b) collaboratively filtering said historical data to derive relationship data representing a relationship between the pilot actions and airplane characteristics;
   (c) collecting said current data from said plurality of sensors during the flight;
   (d) determining that said current data falls into said relationship;
   (e) generating a recommendation for pilot action by applying said relationship to a portion of said current data while a pilot is flying the airplane; and
   (f) causing said control display unit to display symbology representing said recommendation.

13. The system as recited in claim 12, wherein said recommendation comprises any one of the following: a flaps extension profile; a noise abatement departure procedure; a reduction in thrust during takeoff; auto brake and speed brake settings; and a window for required time of arrival at different flap settings.

14. The system as recited in claim 12, wherein said historical data comprises data representing actions and airplane characteristics recorded by a multiplicity of airplanes.

15. The system as recited in claim 12, wherein said airplane characteristics comprise airplane gross weight and distance from destination.

16. A system for recommending pilot action onboard an airplane during a flight, comprising:
   a control display unit onboard the airplane;
   a plurality of sensors onboard the airplane, said sensors being configured to output current data representing pilot actions onboard the airplane and environmental characteristics; and
   a computer system configured to perform the following operations:
   (a) collecting historical data representing pilot actions taken by a community of pilots and environmental characteristics during a multiplicity of flights;
   (b) collaboratively filtering said historical data to derive relationship data representing a relationship between the pilot actions and environmental characteristics;
   (c) collecting said current data from said plurality of sensors during the flight;
   (d) determining that said current data falls into said relationship;
   (e) generating a recommendation for pilot action by applying said relationship to a portion of said current data while a pilot is flying the airplane; and
   (f) causing said control display unit to display symbology representing said recommendation.

17. The system as recited in claim 16, wherein said pilot action comprises extending flaps and said environmental characteristics comprise wind and temperature at the time the flaps are extended.

18. A method for recommending pilot action onboard an airplane, comprising:
   (a) collecting historical data representing pilot actions taken by a community of pilots and environmental characteristics during a multiplicity of flights;
   (b) collaboratively filtering said historical data to derive relationship data representing a relationship between the pilot actions and environmental characteristics;
   (c) piloting the airplane;
   (d) collecting current data representing pilot actions onboard the airplane and environmental characteristics during step (c);
   (e) determining that said current data falls into said relationship;
   (f) generating a recommendation for pilot action by applying said relationship to said current data while the airplane is being piloted: and
   (g) taking a pilot action onboard the airplane in accordance with said recommendation.

19. The method as recited in claim 18, wherein step (b) is performed by an on-ground computer and steps (d) through (f) are performed by a computer onboard the airplane, further comprising uploading said relationship data from the on-ground computer to the onboard computer via a datalink.

20. The method as recited in claim 18, wherein steps (b), (d), (e) and (f) are performed by a computer onboard the airplane.

21. The method as recited in claim 18, wherein said pilot action comprises extending flaps and said environmental characteristics comprise wind and temperature at the time the flaps are extended.

\* \* \* \* \*